July 9, 1963     A. F. REID     3,097,076
PROCESS OF CONCENTRATION OF SOLUTES
Filed March 7, 1958
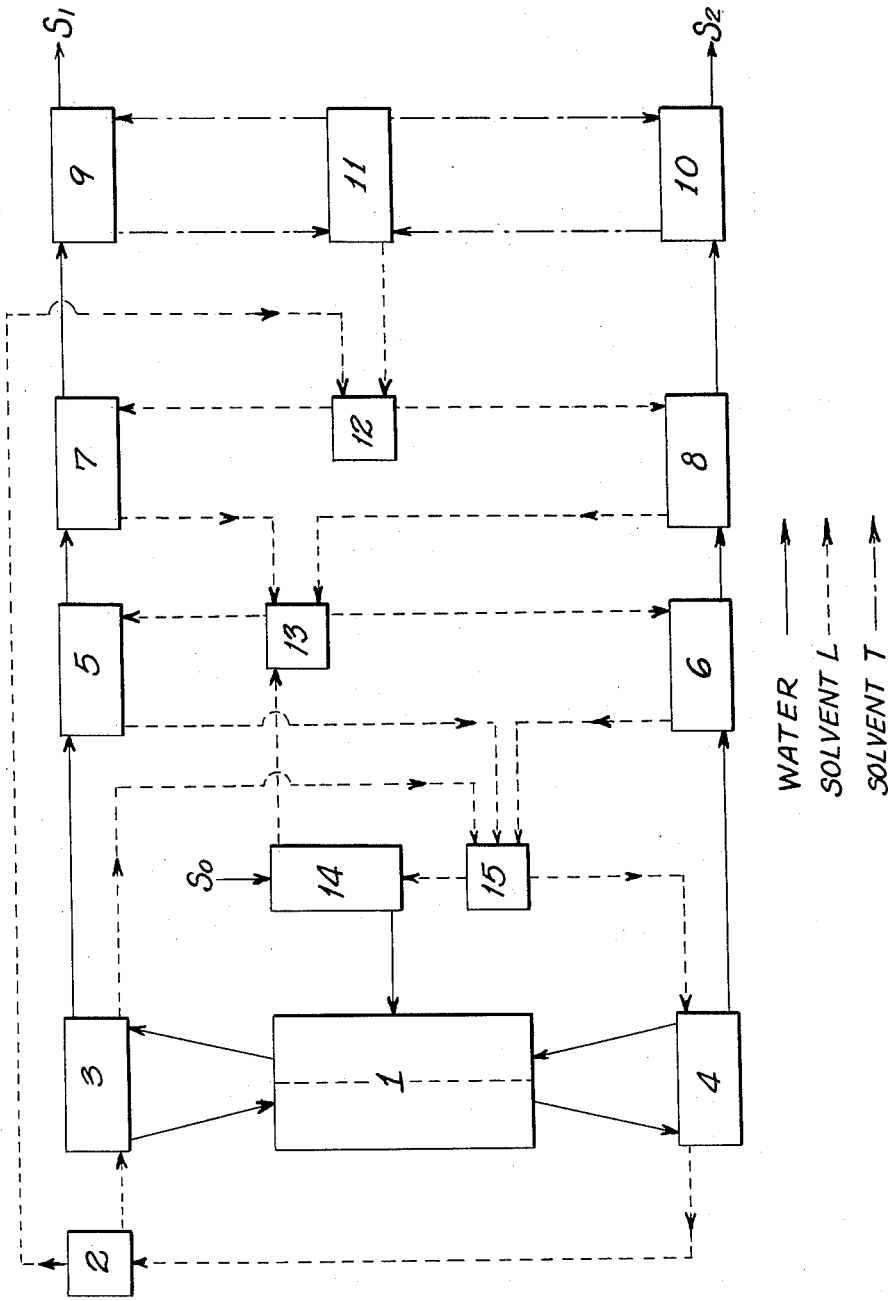
INVENTOR.
ALLEN F. REID
BY
ATTORNEY 3,097,076
Patented July 9, 1963

3,097,076
PROCESS OF CONCENTRATION OF SOLUTES
Allen F. Reid, 5323 Harry Hines Blvd., Dallas, Tex.
Filed Mar. 7, 1958, Ser. No. 719,905
4 Claims. (Cl. 23—306)

This invention relates to the relative concentration of one or more of the constituents of a liquid composition such as a solution. The object of the invention is to provide a process subjecting the solution to a series of treatments in order to increase the proportionate amount of one or more constituents of the solution in part of the solution, while at the same time decreasing their concentration in the remaining portion of the solution. It is a further object of the invention to provide a method employing a series of operations with a recycling and reconditioning of process materials to produce the desired products in an energy-conserving and economic manner.

A special object is the production of industrial, agricultural or domestic household water from sea or brackish water where economy of production is intimately tied to the energy requirements.

In the following description a preferred embodiment is set forth in connection with a drawing showing a flow diagram of a separation process.

In general, the mechanism of this process consists of the treating of a portion of the solution at hand, the introduction of this portion of the solution into a concentration varying cell wherein the starting strength of the original solute is either increased or decreased by the action of the cell followed by the removal of the solution from the cell and the treatment of the solution in order to reestablish the original conditions for the process.

Another portion of the solution is left untreated, is passed into a cell wherein the concentration of the solute is changed in the direction opposite to that of the treated solution, is removed from the cell, and is treated to reestablish the original conditions for the process.

As a result of these operations, a solution with an intermediate concentration of solute has been processed to yield one portion of a more highly concentrated solution and one portion of a depleted solution. For simplicity the terms "solute" and "solvent" are intended to include generally the constituents of a colloidal suspension as well as those of a true solution. Where further concentration or depletion is desired beyond any stage, the products of the concentration procedure described may be further treated by the same process with recycling methods known in engineering practice. One of these recycling methods is the placing of each separation stage contiguous to the next stage with the same type of countercurrent operation as is used in a rectifying system. Another method is a recycling arrangement such as that described in my U.S. Patent 2,772,953, dated December 4, 1956.

One method for obtaining a change of concentration of the solute in a solution as disclosed by this invention is the application of the Donnan effect in the concentration cell. The flow of ions across a semipermeable membrane which is permeable to those ions is affected by the concentration of ions which will not freely penetrate the membrane. This phenomenon is called the Donnan effect.

An example of the operation of this effect is that involving a large molecule NaR which in solution exists in a dissociated state $Na^+$ plus $R^-$. If a semipermeable membrane is chosen which prevents the passage of $R^-$ and NaR but allows the passage of $Na^+$ and $Cl^-$, and if a system is set up with a solution of NaR on one side of the membrane and water on the other side, only a very small amount of $Na^+$ could diffuse through the membrane before the huge electrostatic gradient developed at the membrane prevented further transfer. On the other hand, a solute NaCl would diffuse readily across the membrane because it is present as $Na^+$ and $Cl^-$, both of which can diffuse across the membrane and thus may be transported in pairs without building up a large electrostatic gradient across the membrane. If both NaR and NaCl are placed on one side of the membrane, $Na^+$ and $Cl^-$ would tend to diffuse across the membrane together with the object of establishing equal concentrations of sodium ions and chloride ions on both sides of the membrane. However, since an equal number of sodium ions and chloride ions tend to diffuse across the membrane, at the time the $Cl^-$ concentration has become equal on both sides of the membrane, the $Na^+$ ion concentration still remains higher on the side with the $R^-$. On the other hand, if the $Na^+$ were to continue to diffuse to the other side to equal concentration on both sides of the membrane, then $Cl^-$ ions passing with them would correspondingly reduce the $Cl^-$ concentration to be lower on the side of the $R^-$.

This is resolved by compromise: a steady state with a somewhat greater $Na^+$ concentration is established on the $R^-$ side with the tendency to diffuse toward the other side, and a slightly greater concentration of $Cl^-$ is established on the side opposite the $R^-$ tending to diffuse toward the $R^-$ side. The thermodynamic relationships are approximately that $$[Na^+]_1 \times [Cl^-]_1 = [Na^+]_2 \times [Cl^-]_2$$

where the subscripts denote the sides of the membrane. A similar situation exists where the non-transferable ion is a cation, where the ions involved are multivalent, where mixtures of compounds are present and where the ions are in colloidal suspension.

In an application of the Donnan effect in this invention, if we designate the salt whose concentration we wish to change in the solution by BX which ionizes to $B^+$ and $X^-$ and if we designate the foreign solute to be added by Z, the operation of the method in this example depends on Z having these properties:

(1) Z is ionizable with one ion, either the anion or the cation, common to one of the ions of the salt to be concentrated ($B^+$ or $X^-$).

(2) The other ion of Z not common to an ion of said BX, is not diffusible or only slowly diffusible through a membrane permeable to BX.

(3) Z is soluble in a volatile liquid L (which is not miscible with the original solvent) to the extent that Z may be extracted by L from the solvent.

The process of operation of a single stage would then be as follows:

(1) Placing the solution of BX on both sides of a semipermeable membrane and adding Z to one side: By the Donnan effect the concentration of the BX on the opposite side is increased, that on the side with Z is decreased.

(2) Removing the Z-containing solution from the system and extracting the Z with L: This leaves one part increased in BX concentration and one part decreased in BX concentration.

(3) Concentrating Z in L by distilling off some of the L: This concentrated solution of Z in L can then furnish Z to more solution by extraction.

The following example serves to illustrate the method:

Equal volumes of two aqueous solutions, A and B, were placed on opposing sides of a cellulose membrane permeable to water and NaCl but only very slowly permeable to stearyl dimethyl benzyl ammonium ion ($Y^+$) and left for 30 minutes at 25° C. Originally solution A was 0.0240 molal to NaCl and 0.085 molal to YCl; and solution B was 0.0240 molal to NaCl with no YCl. At the end of the 30 minute interval, solution A was 0.0166 molal to NaCl and 0.083 molal to YCl; and solution B was 0.0314 molal to NaCl and 0.0017 molal to YCl. The product solutions A and B were extracted with $CH_2Cl_2$, decreasing their YCl concentration to insignificant concentrations. Part of the $CH_2Cl_2$ was evaporated, thereby concentrating ZCl in the unevaporated portion to the point furnishing a significant concentration of ZCl to a water solution upon extraction by it.

Another example under somewhat different conditions was an operation at 78° C. Solutions C and D were placed on opposing sides of a membrane permeable to NaCl but not to di-isobutyl cresoxy ethoxy ethyl dimethyl benzyl ammonium ion ($W^+$). Solution C was 0.60 molal to NaCl and 0.316 molal to WCl; and solution D was 0.60 molal to NaCl with no WCl. After 30 minutes the procedure was discontinued and the WCl was extracted from the resulting C and D solutions with $CHCl_3$. The product C solution was 0.50 molal to NaCl and the product D solution was 0.70 molal to NaCl. An alternative method of removal of the WCl from solution was demonstrated by taking a solution identical with solution C and cooling to 8° C. Practically all the WCl separated out leaving a supernatant solution with a ZCl concentration less than 0.0005 molal. When desired, the separated WCl may be redissolved in another solution at temperatures at which it is soluble. This variation of means of removal of an added solute may be used when appropriate in any method set forth in which treatment of the solution is by addition of another solute.

Another example illustrates the case where the common ion is the cation. Equal volumes of solutions E and F were placed on opposing sides of a cellulose membrane permeable to NaCl but only very slowly permeable to dioctyl sulfosuccinate ion ($V^-$) for one hour at 25° C. The original solution E was 0.0240 molal to NaCl and 0.0293 molal to NaV; and solution F was 0.0240 molal to NaCl with no NaV. At the end of the hour, E was 0.0187 molal to NaCl and 0.0283 molal to NaV; and F was 0.0293 molal to NaCl and 0.0010 molal to NaV. The NaV was extracted from these solutions with $CHCl_3$.

In these three examples it is seen that a solution with an intermediate concentration of solute has been processed to yield one portion of a more highly concentrated solution and one portion of a depleted solution.

As an example of the combining of several stages of separation, a system was set up to vary the concentration of NaCl with dioctyl sodium sulfosuccinate (NaV) as the added solute. A 208 centimeter long polyethylene tube, 9.5 millimeters in diameter, was divided into two compartments by a cellulose membrane which ran the length of the tube. A solution G was introduced at one end of the tube on one side of the membrane, and a solution H was introduced at the other end of the tube on the other side of the membrane. Both solutions ran the length of the tube but in a countercurrent direction to each other, leaving the tube at the opposite end but on the same side of the membrane from which they started. This system was operated for eleven hours to allow operation to be in a relatively steady state, after which production samples were taken for analysis. Before entering this concentration cell, solution G was 0.0240 molal to NaCl and 0.0348 molal to NaV; and solution H was 0.00240 molal to NaCl with no NaV. The product G was 0.0011 molal to NaCl and 0.0298 molal to NaV; and the product H was 0.0274 molal to NaCl and 0.0052 molal to NaV. The total flow of G during the four-hour production run was 51.2 milliliters; and the total flow of solution H was 42.5 milliliters. The operation of this series of stages of concentration and depletion may be traced by starting at the end at which G is introduced and H leaves. Solution G loses some of its NaCl through the membrane and continues on its way down the tube. Solution H flows in the opposite direction, continuously acquiring an increased concentration of NaCl from the G on the other side of the membrane, and finally leaving the system with a concentration of NaCl higher than the original concentration of NaCl in G. In the meantime, solution G flows toward its exit becoming progressively less and less concentrated until it leaves the system with a concentration of NaCl at least as low as the original concentration of NaCl in H. The NaV may be removed from this; a small amount of the solution may be removed as product; and the remainder may be reintroduced into the system as solution H. As an overall consequence of this method of operation through several concentration stages and reflux at one end, the original solution G is separated into two portions, one with a higher and one with a lower concentration of NaCl. When desired, the adaptation to a system with reflux and production at both ends can be made using standard engineering principles. Very similar engineering may be done to unite for a concentration cell several stages of the other methods described.

Another method for obtaining a change of concentration of the solute in a solution as disclosed by this invention is the utilization of the change in solubility of a solute when another solute is introduced into the solution. When a solute is soluble in each of two solvents which are found in phases communicating with each other, that solute will distribute itself in such a manner as to favor concentration in the solvent in which it is more soluble. There are many instances in which the addition of a second solute to a solution will decrease the solubility of such a solute. Thus if a semipermeable membrane is placed to separate two portions of a solution of a solute A, and a second solute U of the type which decreases the solubility of A is placed in one portion of the solution, then the A will redistribute itself in the two portions by becoming less concentrated in the U-containing portion. The operation of the method in this example, then, depends on U having these properties:

(1) U is only slowly diffusible or not diffusible through a membrane permeable to the solute which is to be concentrated.

(2) The addition to the solvent of U changes the solubility of A therein.

(3) U is soluble in a volatile liquid L (which is not miscible with the original solvent) to the extent that U may be extracted by L from the solvent.

The process of operation of a single stage would then be as follows:

(1) Placing the solution of A on both sides of a semipermeable membrane and adding U to one side: The concentration of A on the U side is increased or decreased while that on the other side is decreased or increased correspondingly.

(2) Removing the U-containing solution from the system and extracting the U with L: This leaves one solution increased in A concentration and one decreased in A concentration.

(3) Concentrating U in L by distilling off some of the L: This concentrated solution of U in L can then furnish U to more water solution by extraction.

The following example serves to illustrate the method:

Equal volumes of solutions J and K were placed on opposing sides of a cellulose membrane, permeable to water but only very slowly permeable to dioctyl sodium sulfosuccinate (NaV), for 30 minutes at 25° C. The solvent was 1,1',2,2'-tetrachloroethane. NaV increases the solubility of water in the solvent. The original solution J had one part water and 43 parts of NaV per 1000 parts by volume of solvent; and solution K had one part water per 1000 parts of solvent with no NaV. At the end of the 30-minute interval, solution J had 1.8 parts water per 1000 parts of solvent, and solution K had 0.2 parts of water per 1000 parts of solvent with no appreciable concentration changes of NaV. The NaV in J was extracted with water decreasing its concentration in the solvent to an insignificant value.

Another example illustrates the case where the added solute decreases solubility of the original solute in a solvent.

Equal volumes of two aqueous solutions L and M were placed on opposing sides of a cellulose membrane permeable to water and NaCl but only slowly permeable to the surface active agent CPH–30, manufactured by the C. P. Hall Company. CPH–30 is a polyethylene glycol monolaurate, is non-ionic in character, is completely water-soluble at ordinary room temperatures, and becomes insoluble as the temperature rises above 31° C. Solution L was 0.30 molal to NaCl and 20 percent CPH–30 by volume. Solution M was 0.30 molal to NaCl. The solutions were left on opposing sides of the membrane at 25° C. for 30 minutes and then removed. There was no appreciable change in CPH–30 concentration in the solutions but solution L had become 0.267 molal to NaCl and solution M had become 0.333 molal to NaCl. Solution L was then heated to 60° C. At 31° C. a large portion of the U had separated out and at 60° C. had mostly coalesced and risen to the top, leaving a subnatant solution with a CPH–30 concentration of less than 0.02 percent. When desired, the separated CPH–30 may be redissolved in another solution at temperatures at which it is soluble. This example illustrates another variation of the means of removal of an added solute which may be used when appropriate in any method set forth in which treatment of the solution is by addition of another solute.

Another method for obtaining a change in concentration of a solute in a solution as disclosed by this invention is the ultilization of selective sorption by ion exchange resins in the separation cell. An ion exchange resin will exchange ions which are sorbed to it for other ions of the same charge when it is placed in contact with a solution of these other ions. An example of this is a cation exchange resin which has been in sufficient contact with a solution of NaCl so that it is saturated with $Na^+$. Another solute RCl, which ionizes to $R^+$ and $Cl^-$ in the solvent, is added to the solution. The ions sorbed to the resin are in constant exchange with the ions in the solution; consequently, some of the $R^+$ ions are sorbed by the resin which gives off in exchange some of the $Na^+$ ions.

Another example would be an anion exchange resin saturated with $Cl^-$ in a NaCl solution. If another solute NaR, which ionizes to $Na^+$ and $R^-$, is added to the solution, the resin will exchange some of its $Cl^-$ for some of the solution's $R^-$. If we designate the salt whose concentration we wish to change in the solution as BX, which ionizes to $B^+$ and $X^-$, and if we designate the salt to be added as T, the operation of the method in this example depends on T having these properties:

(1) T is ionizable with one ion common to one of the ions of the salt to be concentrated ($B^+$ or $X^-$).

(2) The other ion of T is exchangeable with the other ion of BX on an ion exchange resin.

(3) T is soluble in a volatile liquid L (which is not miscible with the original solvent) to the extent that T may be extracted from the original solvent.

The method of operation of a single stage would then be as follows:

(1) A bed of resin is conditioned to the solution BX.

(2) T is added to a portion of the BX solution to be concentrated in BX and the solution is placed in contact with the resin. There is then an increase in concentration of BX in this solution with a corresponding decrease in concentration of T.

(3) The solution is removed from the resin.

(4) If further concentration is desired, that portion enriched in BX can be advanced to the next stage without extraction of the T. If no further concentration is desired, the T may be extracted with L.

(5) Another portion of the solution to which T has not been added is placed in contact with the resin. It becomes less concentrated in BX and acquires T from the resin.

(6) This solution is removed from the resin.

(7) T is extracted with L from the solution depleted in BX, which leaves a solution that can be used directly, or which can be sent to a succeeding stage if further depletion is desired.

(8) The process continues with the alternate treating of the resin with a solution enriched in T and a solution without T.

(9) T is concentrated in L by distilling off some of L. This concentrated solution of T in L can then furnish T to more water solution by extraction.

The following example serves to illustrate the method:

17.5 cc. of Dowex 50–X4, a cation exchange resin manufactured by The Dow Chemical Company, were placed in a stainless steel screen basket which was alternately dipped into solutions N and P. Solution N was an aqueous solution 0.050 molal to NaCl and 0.050 molal to di-isobutyl cresoxy ethoxy ethyl dimethyl benzyl ammonium chloride (WCl). Solution P was 0.050 molal to NaCl with no WCl. After extensive conditioning in this manner, a series of 20 minute dips of the basket was made at 25° C. into 120 cc. batches of fresh solutions of N and P alternately. During a typical dip into P solution the resin gained 0.063 millimole of $Na^+$ releasing at the same time 0.063 millimole of $W^+$ to the solution. On the succeeding dip into solution N, the resin lost 0.063 millimole $Na^+$ to the solution and gained 0.063 millimole $W^+$ from the solution. In all of these alternate dips the resin exchanged $W^+$ for $Na^+$ when dipped into solution P, and exchanged $Na^+$ for $W^+$ when dipped into solution N. The $W^+$ was removed in the form of WCl from the resultant solutions by extraction with $CHCl_3$ thereby leaving one portion of a solution more concentrated in NaCl and one portion less concentrated in NaCl than the original NaCl solution of intermediate concentration.

An alternative method of removal of the WCl from solution was demonstrated by placing a solution identical with solution N in contact with finely divided activated charcoal. Practically all the WCl was sorbed to the charcoal leaving a solution with a WCl concentration less than 0.00015 molal. The WCl may be recovered from the sorber by conventional methods such as leaching with methanol or chloroform, with subsequent distillation of this solvent. This variation of means of removal of an added solute may be used when appropriate in any method set forth in which treatment of the solution is by the addition of another solute.

A method similar to the use of ion exchange resins in the separation cell is the use of other solid sorbers in the separation cell, a significant difference being that it is not necessary that either the solute to be varied or the added solute be ionizable.

The following example serves to illustrate the method:

Powdered fuller's earth which had been preconditioned by immersion in solutions of trichloroacetic acid and CPH–30 was alternately placed into about 20 times its weight of solutions Q and R. Solution Q was an aqueous solution 0.044 molal to trichloroacetic acid and 10 percent CPH–30. Solution R was 0.044 molal to trichloroacetic acid with no CPH–30. The contacts were made for periods of 20 minutes at 20° C., after which the fuller's earth was removed from the solution and placed in the alternate solution. During each dip in solution R the fuller's earth would sorb some trichloroacetic acid and would release to the solution some CPH–30. During the contact with solution Q the fuller's earth would sorb CPH–30 and release to the solution some trichloroacetic acid. In such a complete cycle one portion of solution would be depleted and one would be concentrated in trichloroacetic acid with no net change in the fuller's earth. When desired to remove the CPH–30 from the solutions, they could be heated to 60° C. at which temperature the CPH-30 would separate out and coalesce for easy removal.

Another method for obtaining a change of concentration of the solute in a solution as disclosed by this invention is the utilization of the change in chemical potential which is generally reflected by a change in solubility of a solute with a change in temperature. As stated before, when a solute is soluble in each of two solutes which are found in phases communicating with each other, that solute will distribute itself in such a manner as to favor concentration in the solvent in which it is more soluble. Thus, if a membrane or other means of suitable division is placed between two portions of a solution of a solute which has a solubility change with temperature, then the solute will redistribute itself in the two portions if the temperatures of the two portions are different from each other. Redistribution will occur in such a manner as to favor concentration of the solute in the solvent at the temperature at which it is more soluble.

The process of operation of a single stage would then be as follows:

(1) Placing portions of the solution on both sides of a membrane permeable to the solute and heating the solution on one side: The concentration of the solute on the heated side is increased and that on the cooler side is decreased, if the solubility of the solute increases with temperature; and the concentration of the solute on the heated side is decreased and that on the cooler side is increased, if the solubility of the solute decreases with temperature increase.

(2) Removing any heat not useful in further concentration steps and using it to heat other solutions in which the solute is to be concentrated or depleted.

The following example serves to illustrate the method:

Two liters of an aqueous solution 0.200 molal to $CaCl_2$ were placed on each side of a 16 cm.$^2$ cellulose membrane, permeable to both water and calcium chloride. On side A the temperature was held at 20° C. On side B the temperature was held at 50° C. After a 3-hour interval, the calcium chloride on side B was 9 percent higher in concentration than the calcium chloride solution on side A.

Separation between the two phases may also be accomplished by a divider other than a membrane. As an example, a thin layer of foam rubber which has communicating avenues from one side to the other may be used. The temperatures used are not critical, except that the two opposing temperatures should not be chosen at which the chemical potential of the solute is the same.

An example of this modification is the following:

Two liters of an aqueous solution 0.200 molal to $CaCl_2$ were placed on each side of a 16 cm.$^2$ thin sheet of foam rubber permeable to both water and calcium chloride. On side A the temperature was held at 20° C. On side B the temperature was held at 50° C. After a 3-hour interval the calcium chloride on side B was 10 percent higher in concentration than the calcium chloride solution on side A.

The engineering of a system employing one of the methods as an example of operation of the processes is described here with reference to the drawing in which: 1 is a concentration cell; 2 and 11 are stills; 3, 4, 5, 6, 7, 8, 9, 10 and 14 are liquid-liquid extractors; 12, 13 and 15 are reservoirs. BX is the solute to be concentrated and depleted in the solvent S, shown as water in the drawing; Z is an added solute; L is a solvent for extracting Z from S, and T is a solvent for extracting L from S, leaving BX.

The operation is as follows:

(1) The S solution to be processed, $S_0$, enters extractor 14, enters an intermediate stage of cell 1, goes up to 3 becoming richer in BX as it goes, picks up Z in extractor 3, goes down through 1 on the other side of the membrane becoming depleted in BX as it goes, enters extractor 4 where Z is removed, and refluxes back through 1.

(2) Appropriate amounts of S solution concentrated in BX, $S_1$, are drawn off at 3 and complementary amounts of S solution depleted in BX, $S_2$, are drawn off at 4. These pass successively through extractors 5 and 7, and 6 and 8 respectively, which remove the last amount of Z. 9 and 10 are extractors to remove L dissolved in the product by extraction with T. 11 is a still where L is distilled from T and returned to the system via 12.

(3) Pure L from stills 2 and 11 extracts the last Z from $S_1$ and $S_2$ respectively in 7 and 8. The effluent L is joined at 13 by more L depleted in Z from passing through 14; this extracts Z from the greater concentrates in 5 and 6. Some of this effluent extracts the refluxing S in 4 and is carried to 2; at 2 the Z is concentrated in L by distillation sufficiently so that it can enrich the refluxing S appropriately in passing through 3. There may be cases where it is more practical to completely distill off L at 2 and transfer the residual Z directly to the solution in which it is to be dissolved, thereby eliminating the need for extractor 3.

Very similar engineering may be done where operation of the process employs another of the methods described in their variations. For example: the substitution of absorbers or thermal separators for extractors, the use of two alternating concentration cells instead of one containing ion exchange resin or solid adsorber, thereby providing continuous rather than intermittent flow in the rest of the system, and so forth.

For the purpose of providing a clear understanding of this invention but without imposing limitation thereon, it will be described with more particular reference to the change of concentration of sodium chloride in a water solution. Making reference to the drawing with the operation as described above, the solution to be varied, $S_0$, is 0.60 molal NaCl in water. For each 3 volumes of $S_0$ supplied there is a yield of 1 volume of $S_1$, 1.78 molal NaCl, and 2 volumes of $S_2$, 0.01 molal NaCl. The added solute is Z; the extracting liquid L is $CHCl_3$; the extracting liquid T is a hydrocarbon of low volatility; the distribution between $CHCl_3$ and water Z is approximately 3 to 1. The concentrations, volumes and the rates of flow of the processed material from stage to stage may be determined by reference to Table 1.

Table 1

| Solvent | From— | To— | Volume | Molarity NaCl | Molarity Z |
|---|---|---|---|---|---|
| $H_2O$ | Supply | 14 | 3 | 0.60 | 0.000 |
| $H_2O$ | 14 | 1 | 3 | 0.60 | .009 |
| $H_2O$ | 1 | 3 | 21 | 1.78 | .027 |
| $H_2O$ | 3 | 1 | 20 | 1.78 | .41 |
| $H_2O$ | 1 | 4 | 20.8 | 0.01 | .38 |
| $H_2O$ | 4 | 1 | 18.8 | 0.01 | .013 |
| $CHCl_3$ | 4 | 2 | 7 | | 1.11 |
| $CHCl_3$ | 2 | 12 | 1 | | 0 |
| $CHCl_3$ | 2 | 3 | 6 | | 1.30 |
| $H_2O$ | 3 | 5 | 1 | 1.78 | .027 |
| $H_2O$ | 5 | 7 | 1 | 1.78 | $10^{-4}$ |
| $H_2O$ | 7 | 9 | 1 | 1.78 | $<10^{-6}$ |
| $H_2O$ | 4 | 6 | 2 | 0.01 | .010 |
| $H_2O$ | 6 | 8 | 2 | 0.01 | $10^{-4}$ |
| $H_2O$ | 8 | 10 | 2 | 0.01 | $<10^{-6}$ |
| $CHCl_3$ | 11 | 12 | 0.03 | | 0 |
| $CHCl_3$ | 12 | 7 | .34 | | 0 |
| $CHCl_3$ | 12 | 8 | .69 | | 0 |
| $CHCl_3$ | 7 | 13 | .34 | | $2.9 \times 10^{-4}$ |
| $CHCl_3$ | 8 | 13 | .69 | | $2.9 \times 10^{-4}$ |
| $CHCl_3$ | 14 | 13 | 1.32 | | $2.9 \times 10^{-4}$ |
| $CHCl_3$ | 13 | 5 | 1.35 | | $2.9 \times 10^{-4}$ |
| $CHCl_3$ | 13 | 6 | 1.00 | | $2.9 \times 10^{-4}$ |
| $CHCl_3$ | 3 | 15 | 6 | | .020 |
| $CHCl_3$ | 5 | 15 | 1.35 | | .020 |
| $CHCl_3$ | 6 | 15 | 1.00 | | .020 |
| $CHCl_3$ | 15 | 14 | 1.35 | | .020 |
| $CHCl_3$ | 15 | 4 | 7 | | .020 |

In this operation of the method the main energy requirements are the operation of stills 2 and 11, evaporating L. Using standard engineering practices, a large portion of that energy may be recovered in the subsequent condensation of the L. An advantage of this system over direct evaporation is that the total heat energy requirements for evaporation can be made lower if the latent heat of vaporization of L is less than that of S or if the distribution of Z between L and S effectively concentrates the Z in L so that a relatively smaller amount of L must be evaporated for the same production of depleted or concentrated solutions. Since the heat of vaporization per volume of $CHCl_3$ is only about 16 percent of the heat of vaporization per volume of water, and since only 1 volume of $CHCl_3$ is distilled for each 2 volumes of $S_2$ produced, the distillation energy requirements using this system are only about 8 percent of the energy requirements in conventional distillation for the production of the same amount of relatively salt-free water.

A wide range of substances may be separated, or may be concentrated, or depleted in solution by the above process. While specific examples have been illustrated, there are other systems for obtaining concentration changes for a collection of other solutes, other ion exchange resins, other solvents, other temperatures, other separators, or other methods of recycling. A range in the degree of concentration is also possible by changes in these variables when more than one solute is present in the same solution.

Principles of separation may be extended to each solute individually; it is thereby evident that changes in concentration of the individual solutes may be at different rates so that the ratios of concentration of these solutes may be changed in the operation; this is tantamount to relative separation of multiple constituents of a solution.

Several methods of the process may be combined, or the methods may be combined with methods of other processes, all in conformance with the steps as explained above, and it will be understood that various modifications can be made without departing from the practice of the invention as set forth in the appended claims.

I claim:

1. A process for increasing the concentration of a solute content in one portion of a solution while decreasing the concentration in another portion of the solution comprising the steps of adding to a first portion of the solution in predetermined condition another solute which changes the solubility in the solvent of the solute to be varied and introducing said treated portion into one compartment of a concentration cell having two compartments separated by a membrane permeable to the solute to be varied and impermeable or only slowly permeable to the added solute, introducing an untreated portion of the solution to the other compartment for the transference of the first solute through said membrane from the treated portion to the untreated portion, carrying said transference to a predetermined range of concentration of said treated portion permitting reduction of said added solute by solvent extraction, separately removing said treated and untreated portions of the solution from the cell and removing said added solute from said treated portion to reestablish the condition of said treated portion prior to said adding of another solute except for the concentration of the solute to be varied.

2. A process for increasing the concentration of a solute content in one portion of a solution while decreasing the concentration in another portion of the solution as set forth in claim 1 in which removal of the added solute is by extraction with another solvent.

3. A process for increasing the concentration of a solute content in one portion of a solution while decreasing the concentration in another portion of the solution as set forth in claim 1 in which removal of the added solute is sorption by a solid material.

4. A process for increasing the concentration of a solute content in one portion of a solution while decreasing the concentration in another portion of the solution as set forth in claim 1 in which removal of the added solute is by change in the temperature of the solution.

References Cited in the file of this patent

UNITED STATES PATENTS

| | | |
|---|---|---|
| 2,023,109 | Van Dijck | Dec. 3, 1935 |
| 2,159,434 | Frey | May 23, 1939 |
| 2,204,072 | Dean | June 11, 1940 |
| 2,772,953 | Reid | Dec. 4, 1956 |

OTHER REFERENCES

Donnan: "Chemical Reviews," vol. 1, 1924, pages 73–90.

Bent: "Science," volume 88, 1938, pages 525–526.